(12) United States Patent
Uesaka et al.

(10) Patent No.: US 6,650,835 B2
(45) Date of Patent: Nov. 18, 2003

(54) PHOTOGRAPHING DEVICE, RECORDING MEDIUM, PROGRAM, CAMERA AND CAMERA PRODUCTION METHOD

(75) Inventors: Takeshi Uesaka, Hachioji-shi (JP); Yoshito Katagiri, Hachioji-shi (JP); Nobuhiro Yamauchi, Hachioji-shi (JP); Hiroyuki Horiuchi, Hachioji-shi (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/164,560

(22) Filed: Jun. 10, 2002

(65) Prior Publication Data
US 2003/0002874 A1 Jan. 2, 2003

(30) Foreign Application Priority Data
Jun. 14, 2001 (JP) .......................... 2001-179961
Apr. 24, 2002 (JP) .......................... 2002-122458

(51) Int. Cl.$^7$ ............................................. G03B 17/02
(52) U.S. Cl. ..................... 396/299; 396/535; 396/543
(58) Field of Search ............................. 396/211, 236, 396/297, 299, 300, 301, 535, 541, 439, 544, 502, 543

(56) References Cited

U.S. PATENT DOCUMENTS 5,752,089 A * 5/1998 Miyazawa et al. ...... 396/300 X
6,496,652 B1 * 12/2002 Mikami et al. ............. 396/299

* cited by examiner

*Primary Examiner*—W. B. Perkey
(74) *Attorney, Agent, or Firm*—Finnegan, Henderson, Farabow, Garrett & Dunner, L.L.P.

(57) ABSTRACT

A photographing device having an operation member to be operated by an external operation, a memory device for memorizing a plurality of control sequences to be conducted according to an operation of the operation member, a setting device for setting a requested control sequence among the plurality of control sequences by correlating the requested control sequence with the control sequence to be controlled by the operation of the operation member, and a control sequence execution device for executing the requested control sequence set by the setting means, according to the operation of the operation member.

2 Claims, 19 Drawing Sheets

FOR RIGHT HANDED USER

UNUSED
SW9(P33)

MODE
SW2(P22)

RELEASE
SW1(P16)

UNUSED UNUSED    REWIND POWER SOURCE    ZOOM U  ZOOM D
SW8(P32) SW7(P31)   SW6(P30) SW5(P17)    SW4(P43) SW3(P20)

| RAM | | PORT NO | FUNCTION |
|---|---|---|---|
| # POWER SW | ← | P17 | POWER SOURCE |
| # RELEASE | ← | P16 | RELEASE |
| # ZOOM UP | ← | P43 | TELE ZOOM |
| # ZOOM DOWN | ← | P20 | WIDE ZOOM |
| # MODE SW | ← | P22 | MODE SW |
| # REWIND | ← | P30 | REWIND |
| . | | . | . |

121

| RAM | | PORT NO | FUNCTION |
|---|---|---|---|
| # POWER SW | ← | P33 | POWER SOURCE |
| # RELEASE | ← | P22 | RELEASE |
| # ZOOM UP | ← | P31 | TELE ZOOM |
| # ZOOM DOWN | ← | P32 | WIDE ZOOM |
| # MODE SW | ← | P22 | MODE SW |
| # REWIND | ← | P17 | REWIND |
| . | | . | . |

121

PHOTOGRAPHING DEVICE, RECORDING MEDIUM, PROGRAM, CAMERA AND CAMERA PRODUCTION METHOD

BACKGROUND OF THE INVENTION

The present invention relates to a photographing device, recording medium, program, camera and camera production method.

An operation button arranged on a photographing device such as a silver halide camera, or digital camera is made to fixedly correspond to a control sequence by which a predetermined function of the photographing device is conducted, and when a certain button is pressed down, the photographing device conducts a predetermined function according to the corresponding control sequence. For example, in the photographing device 1 shown in FIG. 1, an operation button S1 is a power button, operation button S2 is a release button, operation button S3 is a zoom button on a tele side, operation button S4 is a zoom button on a wide side, and when the operation button S4 is pressed down, the camera conducts the zooming to the wide side.

Conventionally, for the operation button, the function corresponding to the operation of the operation button is fixedly set by the internal structure and program of the photographing device. Therefore, for example, in the photographing device shown in FIG. 1, when a type of a camera in which the operation button S1 is the tele side zoom button, operation button S2 is the wide side release button, operation button S3 is the power button, and operation button S4 is the release button, is produced, the internal structure and program are individually designed and produced corresponding to that.

Further, there is a kind of a camera in the photographing device in which, when a predetermined operation button is pressed down, the power source is turned on/off, or a kind of camera in which, by the opening/closing of a slide type lens barrier, the power source is turned on/off, however, even in a case where these photographing devices are produced, respectively proper internal structure and program are designed and produced.

However, in the case where a plurality of kinds of cameras are produced by changing the function which is conducted when a certain operation button is operated, or the power source switching method, when the internal structure and program are newly designed for each kind of camera and the production process is provided separately, there are problems that the cost is increased, and the production process or inventory control becomes complex. Further, in order to satisfy the diversification of the user needs and decrease of the cost, the various developments are made conventionally.

In order to provide the lineup of the various products at low cost, a method of common using of the parts among many kinds of products is used. In the method of commonly using the parts, the parts of the range which can commonly use among products, are commonly used, and in order to make the difference in the function, by producing only parts which can not be commonly used, for each product, the part cost and assembling cost can be reduced.

However, there is a limit in the cost reduction depending on such the common using of the parts.

That is, for the part which can not be commonly used, it is necessary that the metallic die is made for each part, and further, the assembling process is necessary for each different part, and the increase of cost is inevitable. Further, it is necessary that a different control section is provided for each function, and it results in a factor to hinder the cost reduction.

Further, the diversification of the user needs advances, and there is a tendency that the variation of the individual level is requested, and there is a tendency that the quick response to the changing needs is requested. When the different parts for each need are newly used and respond to such the needs, it is not only necessary that the metallic die is newly produced for each need, but it is also necessary that the production process is made different for each need, and there are many cases that the quick response is difficult, and the cost is increased.

The first object of the present invention is, in the photographing device, that the function of the operation button or the power source switching method can be set without changing the internal structure and program.

The second object of the present invention is to provide a camera and a production method of the camera, wherein both of the low cost and quick response are satisfied to the diversification of the needs of the consumer.

SUMMARY OF THE INVENTION

Structures of the present invention to solve the above problems are:

(1). A photographing device comprising: an operation member to be operated by an external operation; a memory device for memorizing a plurality of control sequences to be conducted according to an operation of the operation member; a setting device for setting a requested control sequence among the plurality of control sequences by correlating the requested control sequence with the control sequence to be controlled by the operation of the operation member; and a control sequence execution device for executing the requested control sequence set by the setting means, according to the operation of the operation member.

(5). A computer program product, comprising a program to realize the following functions by a computer to control a photographing apparatus having an operation member to be operated by an external operation: a function to memorize, in a memory device, plural control sequences to be conducted according to an operation of the operation member; a function to set a requested control sequence in the plural control sequences by correlating the requested control sequences with a control sequence to be controlled by the operation of the operation member; and a function to execute the requested control sequence according to the operation of the operation member.

According to the photographing device of (1) and the program described in (5), a plurality of the control sequences to be conducted according to the operation of the operation member are stored in the memory device, and a predetermined control sequence in the stored plurality of control sequences is set by correlating with the control sequence to be controlled by the operation of the operation member, and when the predetermined operation member is operated, the set control sequence is conducted. Accordingly, without changing the internal structure or program, the control sequence to be conducted corresponding to the operation of the operation member can be easily set. As the result, in the production process, by using the common internal structure or program, plural kinds of photographing devices whose operability is different, can be easily produced, and the simplification of the production process and the inventory control, and the reduction of the cost due to the mass production effect can be realized.

The structure of (2) further has a renewal means for renewing the content of setting in the setting device of the structure (1).

According to (2), the setting of the control sequence controlled by the operation of the operation member can be renewed. Accordingly, the specification change according to the function of the operation member can be easily conducted in the photogrgaphing device.

The structure (3) is the photographing device of the structure of (1) or (2), wherein the operation member comprises an operation button or a mechanical element being able to change a state by a predetermined operation; the memory device memorizes a first control sequence to detect an operation of the operation button, and the second control sequence to detect a state change of the mechanical element by the predetermined operation; the setting device effectively sets any one of the first control sequence or the second control sequence; the control sequence execution device executes the effectively set control sequence in the first control sequence or the second control sequence; and the photographing apparatus switches ON/OFF of a power source for the photographing apparatus according to a detection of the operation of the operation button or a detection of the state change of the mechanical element.

According to the structure (3), whether the switching of the power source is conducted by the operation of the operation button or by operating the mechanical sections can be easily set or changed without changing the internal structure or program. As a result, a plurality kind of cameras whose appearance or operability is different can be easily produced, and the simplification of the production process and the inventory control, and the reduction of the cost due to the mass production effect can be realized.

(4). A rewritable recording medium to be loaded in a photographing apparatus comprising an operation member to be operated by an external operation and a memory device to memorize plural kinds of control sequences to be conducted according to an operation of the operation member, wherein the recording medium memorizes a requested control sequence among the plural kinds of control sequences memorized in the memory device by correlating the requested control sequence with the control sequence to be controlled by the operation of the operation member.

According to the structure (4), according to the content of the correlation of the operation member with the control sequence stored in the recording medium, because the photographing device sets the control sequence to be conducted by operating the control member and conducts it, by only changing the content of the recording medium and mounting it in the photographing device, it can be changed to the kind of photographing device whose operability is different. As the result, in the production process or the specification change, the kind of photographing device whose operability is different can be easily produced, and the simplification of the production process and the inventory control, and the reduction of the cost due to the mass production effect can be realized.

(6). A camera comprising: a camera main body having a function setting device for setting a function; and a cover having an activating member to act on the function setting device for setting a function; wherein, the camera has the function being set by the function setting device activated by the cover.

(7). The camera of the structure (6), wherein the camera main body comprises a function realization means for realizing the function being set by the function setting device.

(8). The camera of the structure (7), wherein the function realization means comprises a memory for storing a program for realizing the function.

(9). A camera comprising: a camera main body having a function setting device for setting a function; and a cover not having an activating member to act on the function setting device for setting a function; wherein, the camera does not have the function.

(10). A camera manufacturing method comprising: preparing a camera main body having a function setting device for setting a function, a first cover having an activating member to act on the function setting device for setting a function, and a second cover not having the activating member; assembling the camera main body and the first cover to make a first camera having the functions set by the function setting device activated by the first cover; and assembling the camera main body and the second cover to make the second camera not having the function.

(11). A camera comprising: a camera main body having a first function setting device for setting a function and a second function setting means, which is provided at a different position from the first function setting means, for setting the function; and a first cover having a first operation section by which the operation of the first function setting means can be conducted, and the first cover not having a operation section by which the operation of the second function setting means can be conducted; wherein the function can be set by the first operation section.

(12). A camera manufacturing method comprising: preparing a camera main body having a first function setting means for setting a function and a second function setting means, which is provided at a different position from the first function setting means, for setting the function; preparing a first cover having a first operation section by which the operation of the first function setting means can be conducted, and the first cover not having a operation section by which the operation of the second function setting means can be conducted, and a second cover having a second operation section by which the operation of the second function setting means can be conducted, and the second cover not having a operation section by which the operation of the first function setting means can be conducted; and assembling the camera main body with the first cover or the second cover to make two kinds of camera, wherein the same function is set at different positions by each kind of the two kinds of camera.

Figure 1:
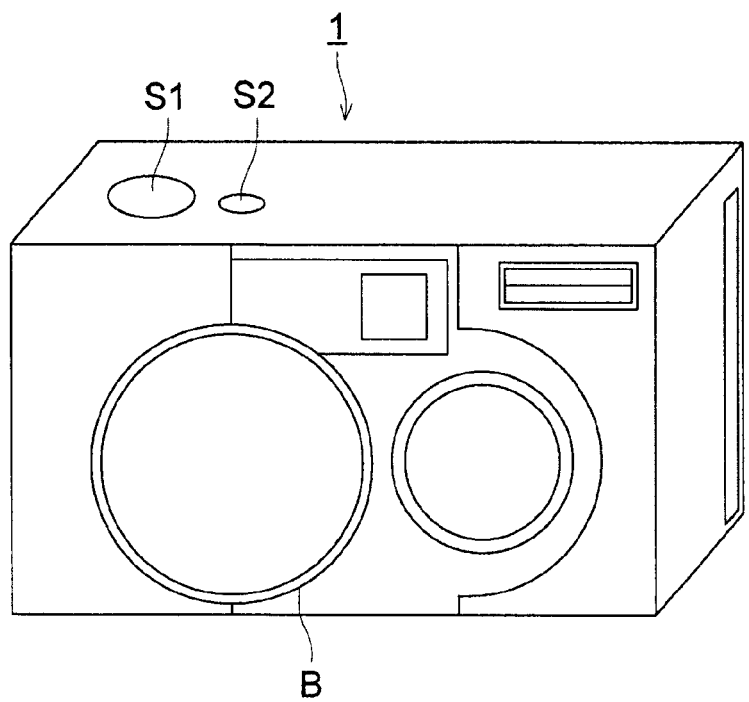
FIGS. 1(a), (b) are appearance views showing a digital camera 1 according to the present invention.
Figure 1:
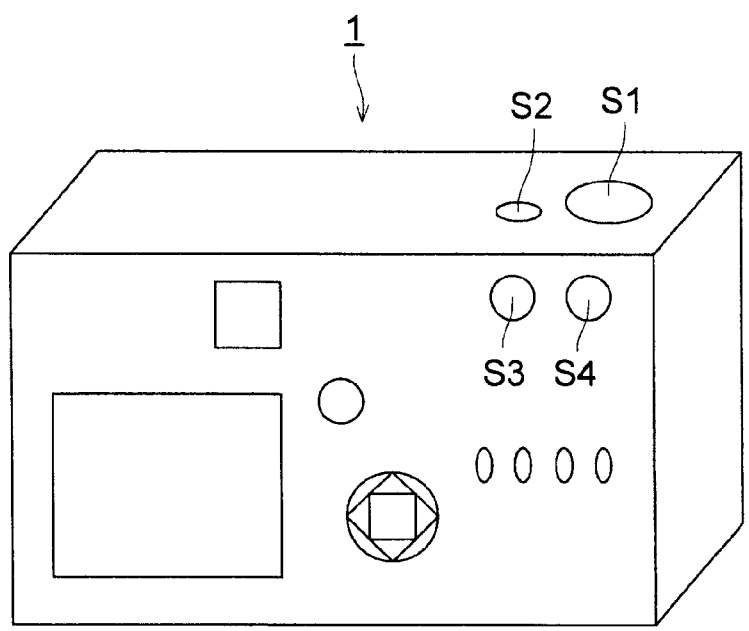

DETAILED DESCRIPTION OF THE
PREFERRED EMBODIMENT

Referring to the drawings, the present embodiment will be detailed below.
(Embodiment 1)

Initially, a structure will be described below. FIGS. 1(a), (b) are appearance views of a digital camera 1 in the present embodiment. FIG. 1(a) is a front view of the digital camera 1, and FIG. 1(b) is a rear view of the digital camera 1. As shown in FIGS. 1(a), (b), the digital camera 1 is provided with a slide type lens barrier B on the front portion, an operation button S1 and an operation button S2 on the upper surface portion, and an operation button S3 and an operation button S4 on the rear surface portion.

Figure 2:
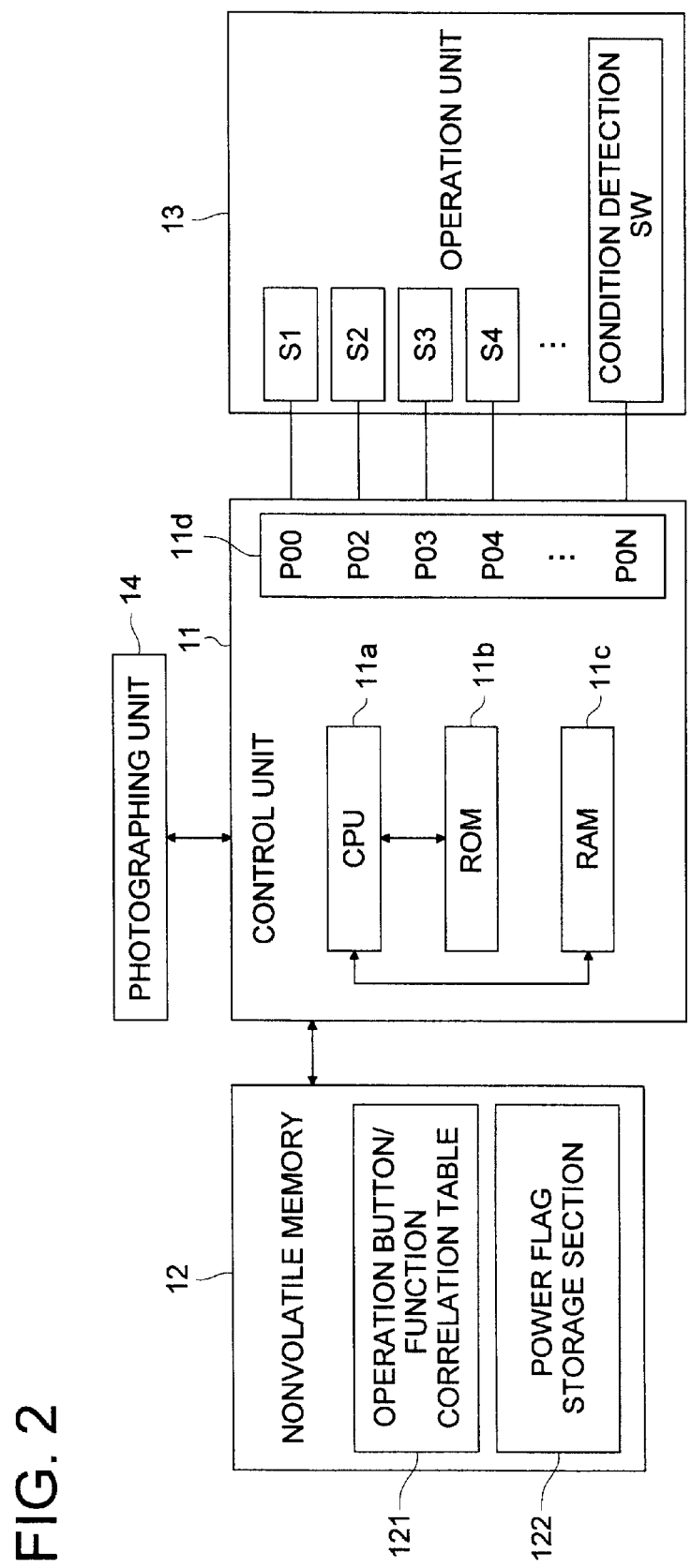
FIG. 2 is a block diagram showing by outlining the functional structure of the digital camera 1 of FIGS. 1(a), (b).

FIG. 2 is a block diagram showing by outlining the functional structure of the digital camera 1. Referring to FIG. 2, the main portion structure of the digital camera 1 will be described below.

As shown in FIG. 2, the digital camera is structured by a control unit 11 having a CPU 11a, ROM 11b, RAM 11c, non-volatile memory 12, operation unit 13, and photographing unit 14.

The CPU (Central Processing Unit) 11a reads the program previously stored in the ROM 11b for controlling the digital camera 1, and develops it to the RAM 11c, and according to the developed program, controls the whole digital camera 1. Further, the CPU 11a conducts, according to the read program, each kind of processing such as an operation button function setup conducting processing. The CPU 11a has functions as the setting means, control sequence conducting means, renewal means, and power source switching means which are described in claims of the present invention.

The ROM (Read Only Memory) 11b stores each kind of program to control the digital camera 1. For example, in the present embodiment, the ROM 11b stores a plurality of programs of the control sequence conducted according to the operation of the operation button or slide type lens barrier B. The ROM 11b has a function as the memory device described in Claims of the present invention.

The RAM (Random Access Memory) 11c temporarily stores the program and each kind of data read from the ROM 11b and non-volatile memory 12 when the control is conducted by the CPU 11a.

The I/O port 11d has the input ports P01, P02, P03, . . . , corresponding to each of operation buttons S1, S2, S3, . . . , of the operation unit 13, and when each operation button of the operation unit 13 is operated, the operation signal inputted into the corresponding input port is outputted to the CPU 11a. Further, into the port P0N connected to the condition detection SW, the state detection signal corresponding to the open or close condition of the slide type lens barrier B is inputted.

The non-volatile memory 12 is structured by an EEPROM (Electrically Erasable and Programmable ROM). In the non-volatile memory 12, the initial value data of each kind function or the setting table which is stored in the production process of the digital camera 1 or at the time of specification change, is stored. The non-volatile memory 12 has a function as the recording medium described in Claims of the present invention.

Figure 3:
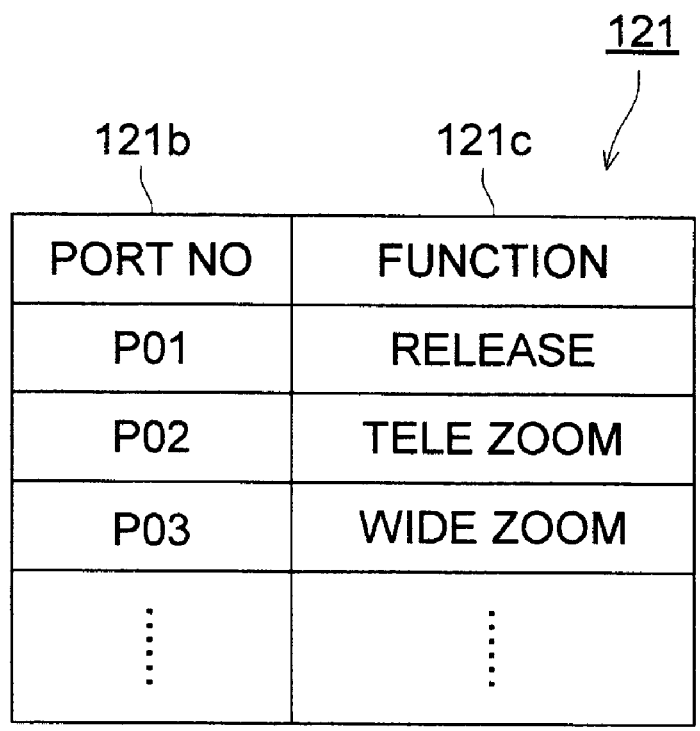
FIG. 3 is a view showing an example of data stored in the operation button/function correlating table 121 of FIG. 2.
Figure 4:
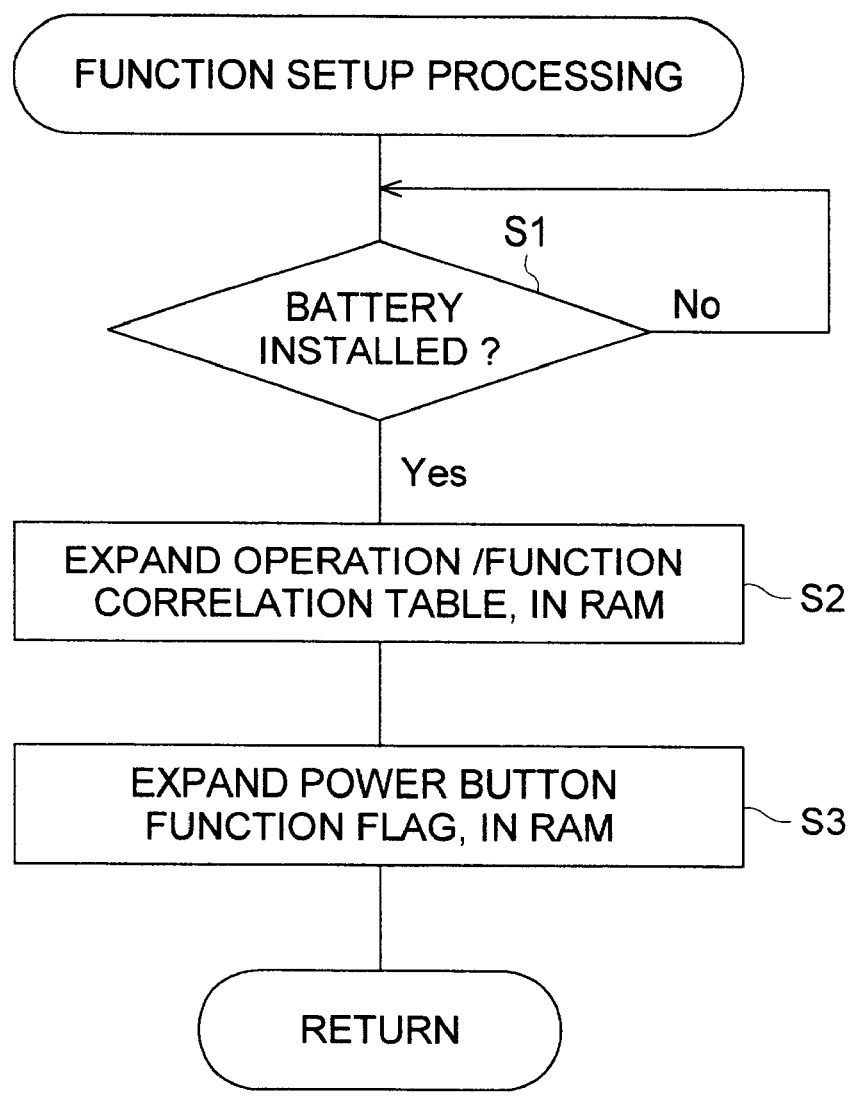
FIG. 4 is a flow chart showing the operation button function setup conducting processing to be conducted by a CPU 11a in FIG. 2.

In the present embodiment, the non-volatile memory 12, as shown in FIG. 2, has the operation button/function correlation table 121, and the power flag storage section 122. Referring to FIG. 3, the specific data structure in the operation button/function correlation table 121 will be detailed below.

FIG. 3 is a view showing a data storing example in the operation button/function correlation table 121 in which the operation button and the function conducted by operating the operation button are made correspondent with each other and stored. As shown in FIG. 3, the operation button/function correlation table 121 has a port number storing area 121b in which the input port number (for example, "P01", "P02", "P03", . . . ) corresponding to the operation button which is exclusively allotted to each operation button arranged in the digital camera 1 is stored as [the port number], and a function area 121c in which the data expressing the corresponding function (for example, "release", "tele zoom", "wide zoom", . . . ) is stored as [the function].

In the power flag storage section 122 shown in FIG. 2, the switching of the power source ON/OFF of the digital camera 1 is stored, and when a predetermined operation button is operated, "0", and when ON/OFF is turned by the condition detection SW by the open and close of the slide type lens barrier B, "1" is stored.

The operation unit 13 is structured by each of operation buttons S1–S4 and the slide type lens barrier B which are provided on the upper surface and rear surface of the digital camera 1. Each of operation buttons S1–S4 outputs the operation signal to the CPU 11a. When the operation signal is outputted from the operation button, the CPU 11a conducts the function (control sequence) which is set by corresponding to the operated operation button. The slide type lens barrier B turns ON/OFF of the condition detection SW by opening and closing when "1" is stored in the power flag storage section 122, and the CPU 11a turns ON/OFF of the power source by the state detection signal inputted from the condition detection SW. Each of operation buttons S1, S2, S3 of the operation unit 13 has the function as the operation members described in Claims in the present invention. Further, the slide type lens barrier 2 has the function as the mechanical section described in Claims of the present invention.

The photographing unit 14 is structured by a photographic optical system, not shown, photographic optical system drive circuit, CCD (Charge Coupled Device), CCD drive circuit, and A/D converter, and when a predetermined operation button of the operation unit 13 is pressed down, according to the command of the CPU 11a, the photographic processing is conducted.

Figure 6:
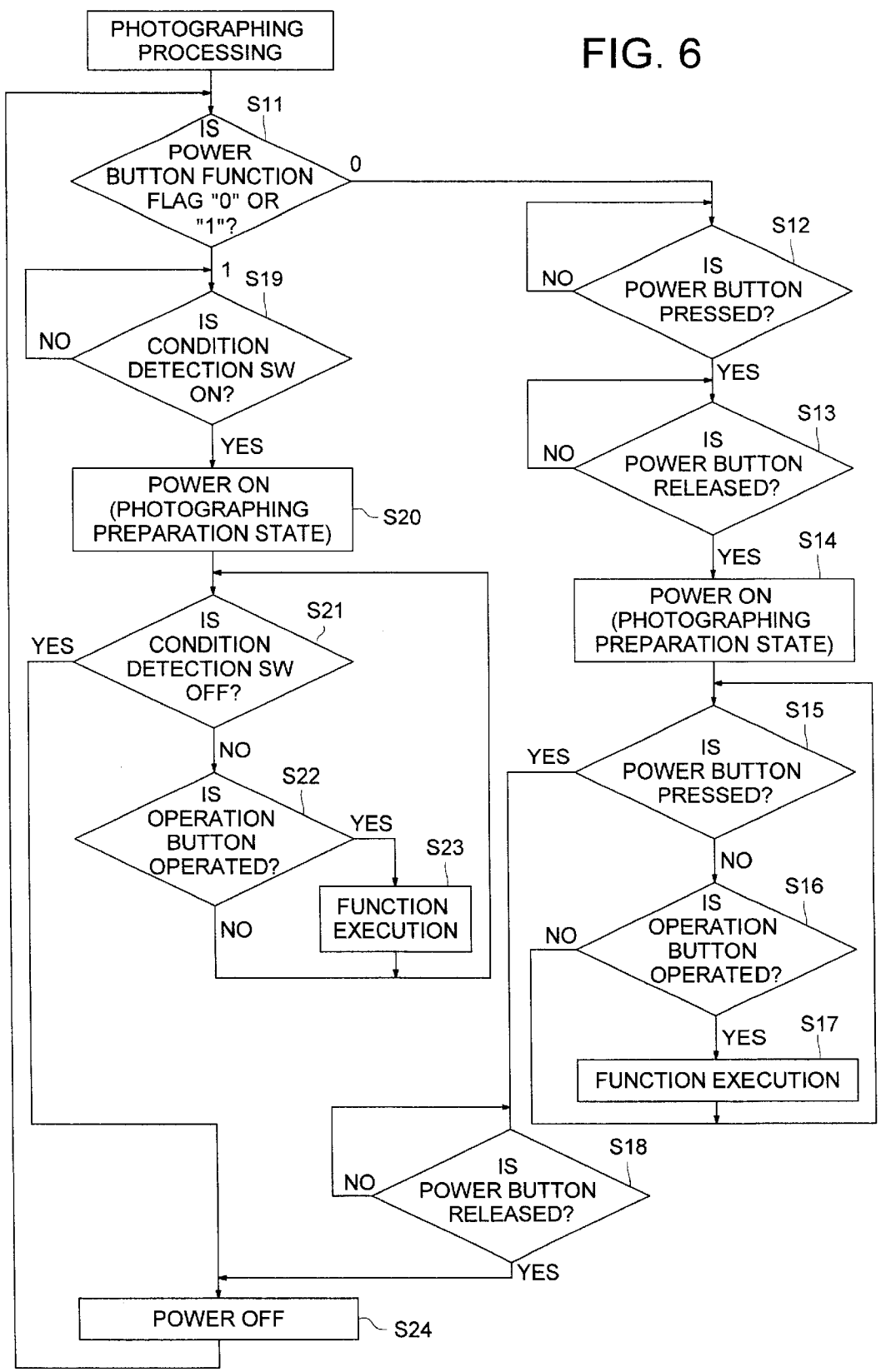
FIG. 6 is a flow chart showing the operation button function setup conducting processing to be conducted by the CPU 11a in FIG. 2.

Next, the operation will be described. Referring to the flowchart of FIG. 6, the function setup conducting processing conducted by the digital camera 1 will be described below.

Figure 5:
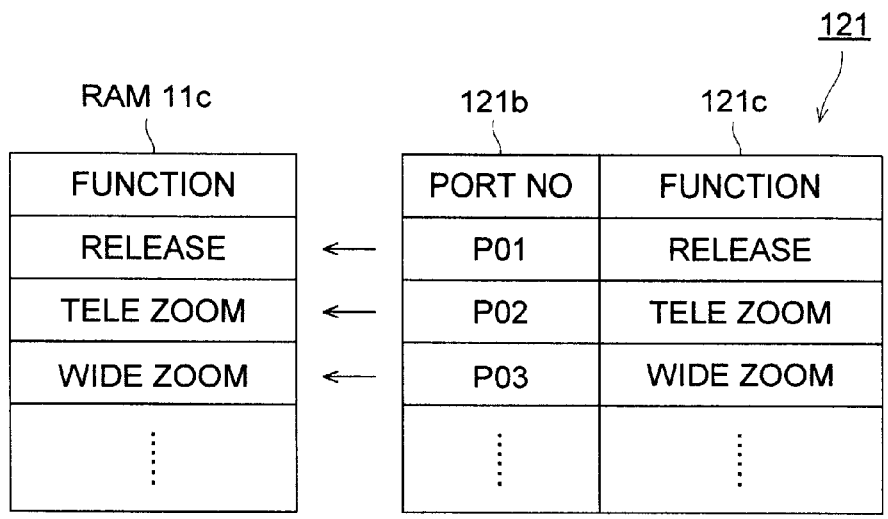
FIGS. 5(a), (b) are illustrations of the development to a RAM 11C of the information of the operation button/function correlation table 121 and a power flag storage section 122.
Figure 5:
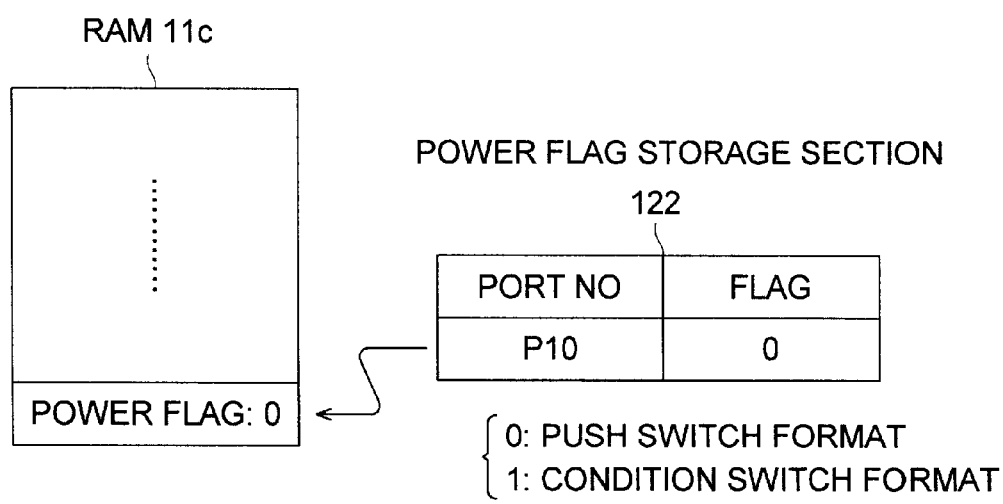

When the power source is turned on in the photographing device in S1, as shown in FIG. 5(a), the CPU 11a refers to the operation button/function correlation table 121 of the non-volatile memory 12, develops on the RAM 11c the information relating to the function which is correlated with a port corresponding to the operation button in the operation button/function correlation table 121, and sets the function (control sequence) to be conducted when the operation button is operated (step S2). Next, the CPU 11a refers to the power flag storage section 122, and develops the power source flag onto the RAM 11c (step S3). Herein, "0" shows that the power source is set so that it is detected by the operation signal of a predetermined operation button, and "1" shows that it is set so that the power source is detected by the condition detection switch by the opening and closing of the slide type lens barrier B. Next, the photographing processing will be described. Initially, the CPU 11a refers to the power source flag developed onto the RAM 11c. When it is judged that "0" is stored in the power source flag (step S0), the CPU 11a observes the pressing signal inputted from the operation button (hereinafter, called power button) to which the power source function is set in step S1 (step 12). When the pressing signal is inputted from the power button (step S12; YES), the CPU 11a waits the releasing of the pressed power button (step S13). When the power button is released (step S13; YES), the CPU 11a switches the power source to the ON status, and goes to the photographic ready state (step S14).

When the power source is in the ON status, the CPU 11a observes again the pressing signal inputted from the power button (step S15). When the operation signal from the other operation button except the power button is inputted (step S16; YES) without the pressing signal from the power button being inputted (step S15; NO), the CPU 11a reads the program corresponding to the function set to the operated operation button from the ROM 11b, and conducts the control sequence of the function (step S17). In the step S16, when the operation signal from the other operation button except the power button is not inputted (step S16; NO), the CPU 11a returns to step S15, and observes the pressing signal from the power button.

In step S15, when the pressing signal is inputted from the power button (step S15; YES), the CPU 11a goes to step S18, and waits that the pressed power button is released (step S18). When the power button is released (step S18: YES), the CPU 11a switches the power source to the OFF status (step S24), and returns to step S11, and repeatedly conducts step S11–S24 until the electric power of the turned-on battery is consumed.

On the one hand, when the CPU 11a, in step S11, judges that "1" is stored in the power flag storage section 122, the CPU 11a observes the condition detection SW (step S19) which is switched by interlocking with the open and close state of the slide type lens barrier B. When the slide type lens barrier B is in opened state, and the condition detection SW is switched to ON (step 19; YES), the CPU 11a switches the power source to ON state, and goes to the photographic ready state (step S20).

When the power source is in ON state, the CPU 11a observes again the condition detection SW which is switched by interlocking with the open and close state of the slide type lens barrier B (step S21). When the operation signal from the operation button is inputted (step S22; YES) without the condition detection SW being switched (step S21; NO), the CPU 11a reads the program corresponding to the function set to the operated operation button from the ROM 11b, and conducts the control sequence of the functions (step S23). In step 22, when the operation signal from the operation button is not inputted (step S22; NO), the CPU 11a returns to step S21, and observes the condition detection SW.

In step S21, when the slide type lens barrier B is in closed state, and the condition detection SW is switched to OFF (step S21; YES), the CPU 11a goes to step S24, and turns the power source OFF. Then, the CPU 11a returns to step S11, and repeatedly conducts S11–S24 until the electric power of the turned-on battery is consumed.

In the case where the turned-on battery is taken out when the electric power of the turned-on battery is consumed, because the correspondence of the operation button with the function set in the step S1 is released, when the battery is turned on again, the CPU 11a conducts again the operation button function setup conducting processing from step S1, and sets the function of the operation button. In this case, when the content of the non-volatile memory 12 is changed, the operation button is renewed to the new setting content.

Figure 7:
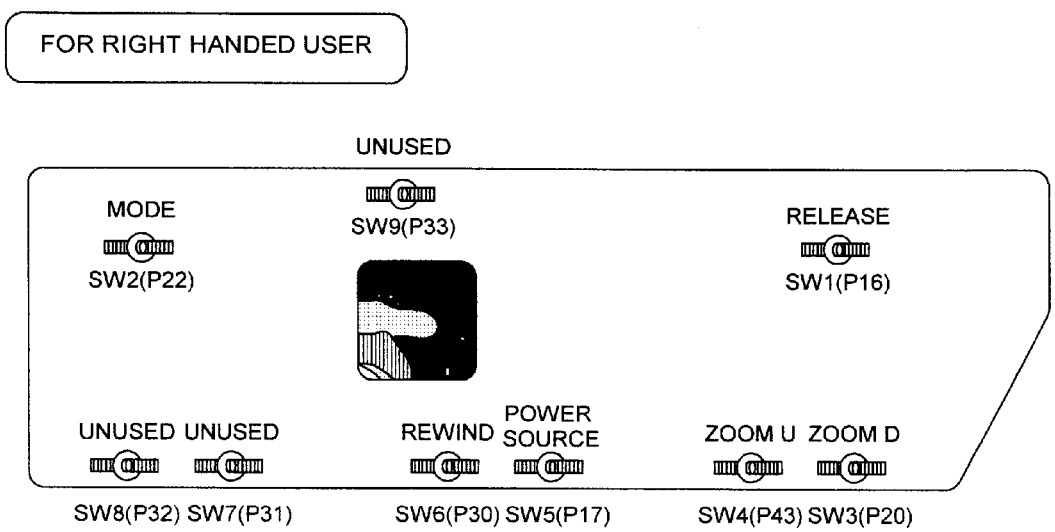
FIG. 7(a), (b) show an arrangement view of each operation button on a camera substrate for the right-handed user, and the correspondence table of each function and operation button (port).
Figure 8:
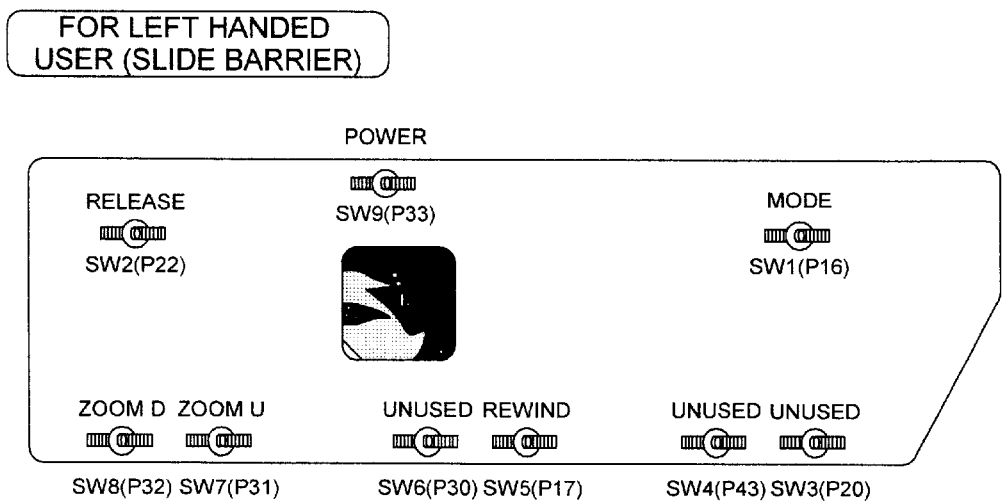
FIGS. 8(a), (b) show an arrangement view of each operation button on the camera substrate for the left-handed user, and the correspondence table of each function and operation button (port).

Next, a method by which each function is made to correspond (set) to each port corresponding to each operation button will be described. When the digital camera 1 is produced, the operation button/function correlation table 121 of the non-volatile memory 12 is made, and stored. For example, a case where the operation button is arranged so that the digital camera 1 is easily used for the right-handed user, will be described. FIG. 7(a) shows the arrangement state of a plurality of operation buttons provided on the digital camera 1. Herein, when the release button or zoom button is desired to arrange on the right side of the digital camera 1, as shown in FIG. 7(a), so that the digital camera 1 is easily used for the right-handed user, each function (function to conduct ON/OFF of the power source, function to turn ON the release switch) is allotted to a port (P22, P16 in FIG. 7(a)) corresponding to each operation button by 1 to 1, and as shown in FIG. 7(b), in the operation button/function correlation table, the correspondence of each port with each function is stored. Thereby, to the port P16 corresponding to the button in the right upper portion of the drawing, the release function is set, and to the ports P43 and P20 corresponding to the button in the right lower portion of the drawing, the tele zoom function and wide zoom function are set. As described above, because the buttons on the right side of the digital camera 1 can be set to the buttons to control the functions of the release or zoom which are the functions whose frequency of use is high when the photographing is conducted, the digital camera which is easily used for the right-handed user, can be produced by forming or changing the operation button/function correlating table of the non-volatile memory 12. Further, in the same manner, when the operation button is arranged so that the digital camera 1 can be easily used for the left-handed user, as shown in FIG. 8(b), to each port corresponding to each operation button by 1 to 1, each function is allotted and the operation button·function table is made. Thereby, as shown in FIG. 8(b), the release function, and zoom function whose frequency of use is high, are set to the left side buttons. As described above, because the buttons on the left side of the digital camera 1 can be set to the buttons to control the functions of the release or zoom which is the function whose frequency of use is high when the photographing is conducted, the digital camera which is easily used for the left-handed user, can be produced when the operation button/function correlation table of the non-volatile memory 12 is made or changed. As described above, the making or changing of the operation button/function correlation table of the non-volatile memory 12 is conducted in the production process, however, a structure that, after the user purchases the digital camera 1, the user itself changes the operation button/function correlation table of the non-volatile memory 12, may also be adopted. For example, the digital camera 1 is set to the setting mode, and in the display means provided in the digital camera, for example, a list of the function is displayed together with the arrangement view of the button, and the user can allot and set each function to each button. In this connection, in the same manner as the making or changing of the operation button/function correlation table 121, it can be set when the power flag storage section 122 is made or changed in the production process, whether the switching of the power source ON/OFF of the digital camera 1 is conducted by the operation of a predetermined operation button, or by, for example, the opening or closing of the slide type lens barrier B.

As described above, the CPU 11a refers to the operation button/function correlation table 121 of the non-volatile memory 12 at the time of turning-on of the battery, and by the function made correspondent to the operation button in the operation button/function correlation table 121, it sets the function (control sequence) to be conducted when the operation button is operated. Further, the CPU 11a refers to the power flag storage section 122, and when it is judged that "0" is stored, the CPU 11a observes the operation signal inputted from the power button, and when the pressing signal is inputted and further the power button is released, the power source is turned ON, and the CPU 11a enters into the photographing ready state. In the photographing ready state, when the operation button is operated, the CPU 11a conducts the function (control sequence) set to the operation button. In the photographing ready state, when the pressing signal is inputted from the power button, and further the power button is released, the CPU 11a turns OFF the power source.

On the one hand, when it is judged that "1" is stored in the power flag storage section 122, the CPU 11a observes the condition detection SW which is switched by interlocking with the open and close condition of the slide type lens barrier B, and when the slide type lens barrier B is in the opened state and the condition detection SW is switched to ON, the CPU 11a turns ON the power source, and enters into the photographing ready state. In the photographing ready state, when the operation button is operated, the CPU 11a conducts the function (control sequence) set to the operation button. In the photographing ready state, when the slide type lens barrier B is in the closed state, and the condition detection Switch is turned OFF, the CPU 11a turns OFF the power source.

Accordingly, because the digital camera 1 selects and conducts the power source detection sequence according to a value stored in the non-volatile memory 12, by only changing the value stored in the non-volatile memory 12, the power source detection sequence can be changed without changing the other internal structure and program. Further, because the digital camera 1 sets the function corresponding to the operation button according to the content previously stored in operation button/function correlation table 121, by only changing the content of the operation button/function correlation table 121, the setting of the function corresponding to each operation button can be changed without changing the other internal structure and program. As the result, depending on the content stored in the non-volatile memory 12 in the production process or at the time of specification change, the variation models of cameras in which the appearance or operability is different, can be easily produced. Further, because the internal structure and the program can be used commonly, it is not necessary that the internal structure and program are designed and produced for each kind of cameras. As the result, the cost reduction due to the simplification of the production process and inventory control, and the mass production effect can be realized.

In this connection, the description in the above embodiment is a preferred example of the digital camera 1, and is not limited to this. For example, in the above embodiment, the digital camera is described, however, the present invention is not limited to that, but can be applied when it is the photographing device such as the silver halide camera or video camera. Further, relating also to the detailed structure and the detailed operation, the present invention can be appropriately changed within the range from which the spirit of the present invention is not departed.

(Embodiment 2)

Figure 9:
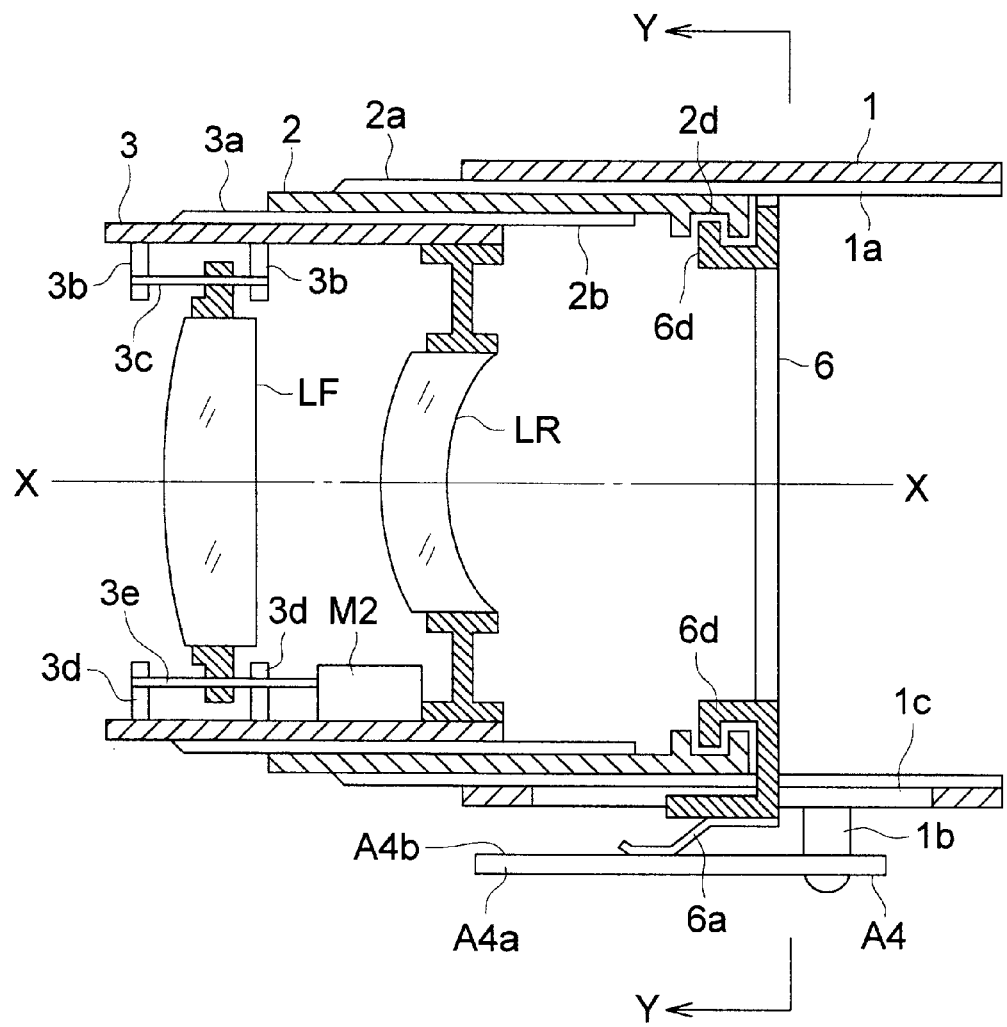
FIG. 9 is a sectional view of a lens barrel section of a camera according to the embodiment 1 of the present invention.
Figure 10:
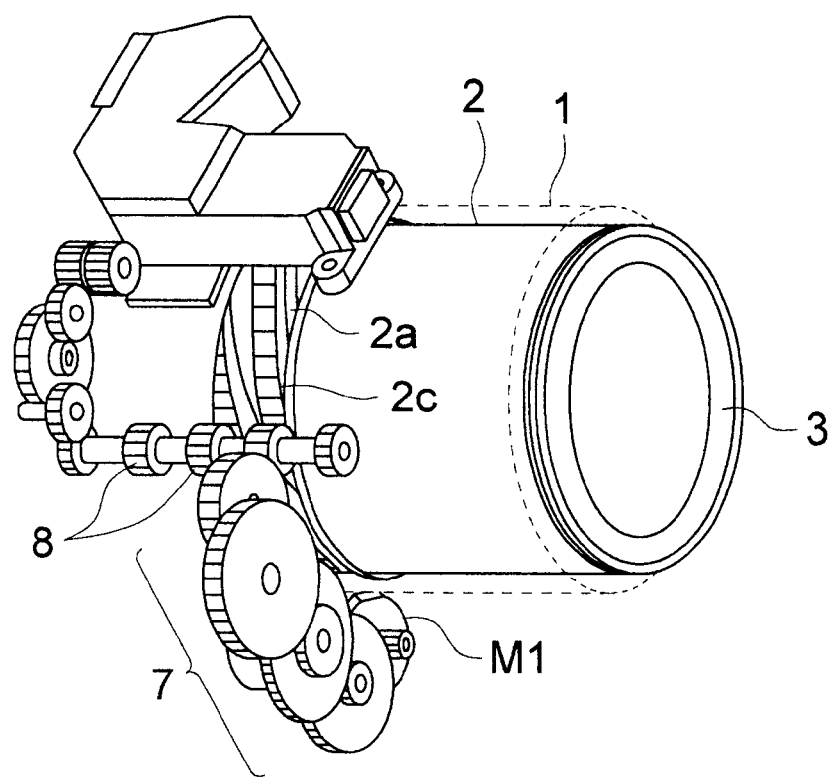
FIG. 10 is a perspective view of the lens barrel section of the camera according to the embodiment 1 of the present invention.
Figure 11:
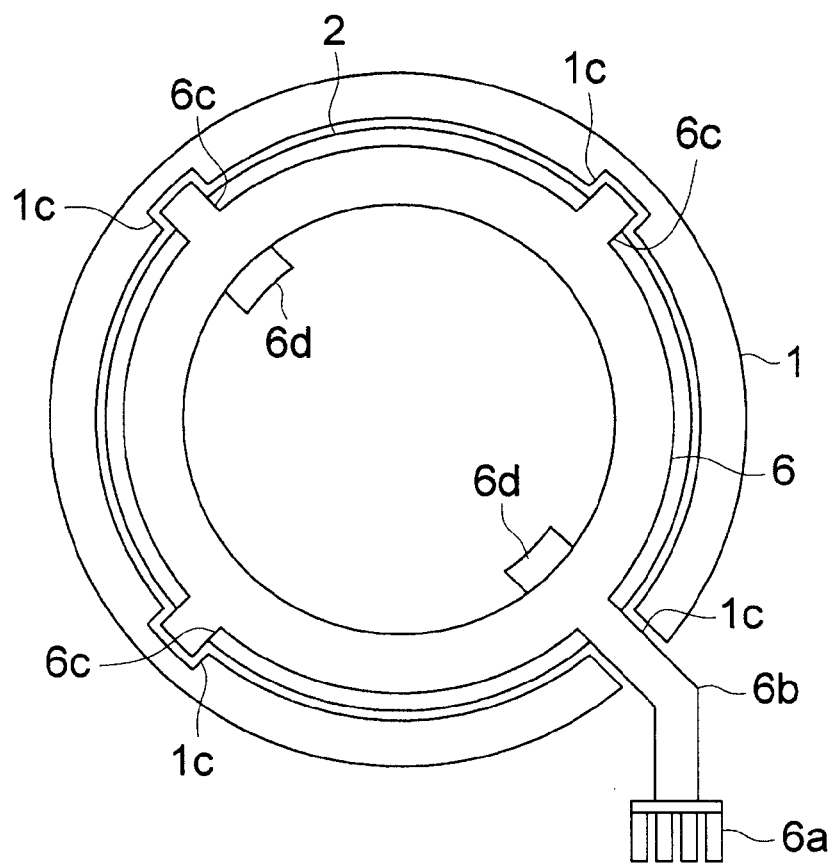
FIG. 11 is a sectional view taken along Y—Y line in FIG. 1.
Figure 12:
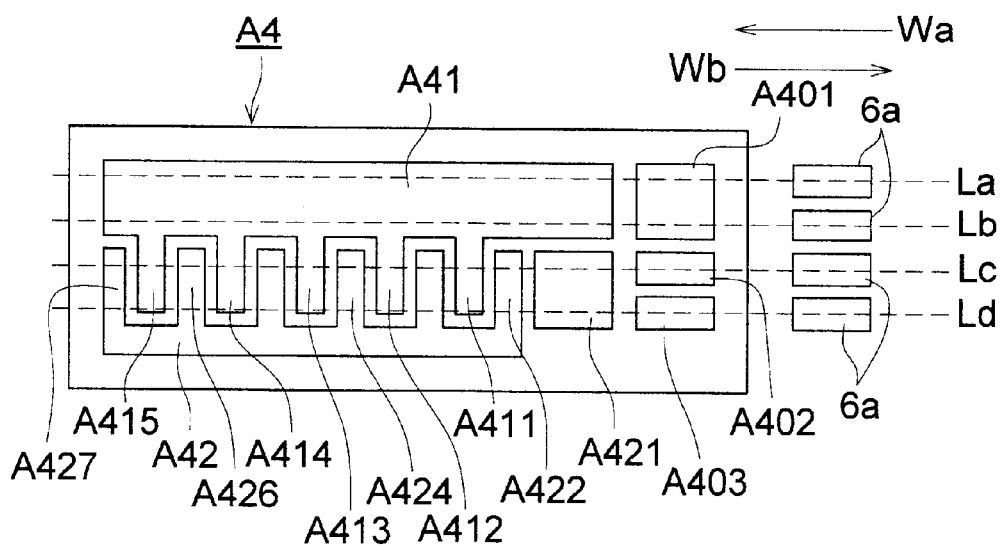
FIG. 12 is a view showing an electrode member.
Figure 12:
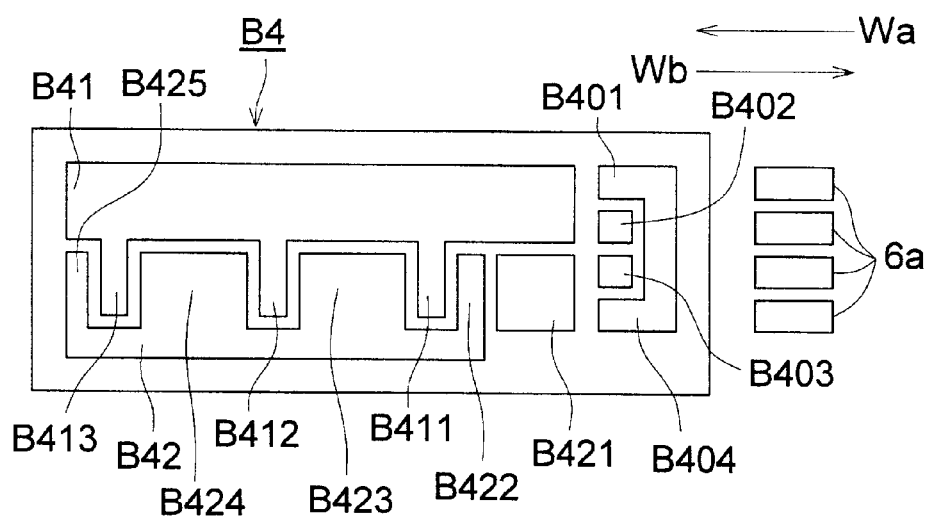

Referring to FIG. 9 to FIG. 12, the embodiment 2 of the present invention will be described. FIG. 9 is a sectional view of a lens barrel section of the embodiment 2, FIG. 10 is a perspective view of the lens barrel section of the embodiment 2, FIG. 11 is a sectional view taken along Y—Y line in FIG. 1 and FIG. 12 is a view showing an electrode member.

The embodiment 2 of the present invention is characterized in that, in the variable focusing camera, the almost parts including the variable focusing lens are made commonly usable with each other, and a plurality of kinds of cameras in which the changing characteristic of the focal distance is different are realized.

Numeral 1 is a fixed lens barrel as the fixed support member fixed onto the camera main body frame (not shown), and has a screw 1b as a female helicoid 1a and an attachment portion. Numeral 2 is the first movable lens barrel as the movable support member, and has a male helicoid 2a engaged with the female helicoid 1a, female helicoid 2b, gear section 2c (shown in FIG. 2), and a groove 2d formed on the inner periphery of the movable lens barrel 2. Numeral 3 is the second movable lens barrel and has a male helicoid 3a engaged with a female helicoid 2b, and lens support members 3b and 3d. The movable lens barrel 3 is guided by a guide member, not shown, so as to be movable in the optical axis direction X and not to be rotated, and such the guide mechanism is well known.

The variable focusing lens in the present embodiment comprises the a rear lens group LR as the lens element, and a front lens group LF as the lens element. The rear lens group LR is fixed onto the movable lens barrel 3. Onto the movable lens barrel 3, a motor M2 to drive the front lens group LF is fixed. Numeral 3e is a screw type screw rod rotated and driven by the motor M2, and rotatably supported by the lens support member 3d fixed onto the movable lens barrel 3 and drives the front lens group LF in the optical axis direction. The guide bar 3c is supported in parallel with the optical axis by the lens support member 3b fixed onto the movable lens barrel 3, and movably supports the front lens group LF in the optical axis direction.

The motor M1 fixed onto the camera main body rotates and drives the movable lens barrel 2. That is, as shown in FIG. 10, the movable lens barrel 2 is driven by a drive system composed of a gear train 7, gear 8 which is divided into the plural, and a gear section 2c formed onto the movable lens barrel 2. As shown in FIG. 2, the gear section 2c is formed on the movable lens barrel 2 so that it is alternately arranged with the male helicoid 2a, and the gear 8 is also divided into the plural corresponding to the division arrangement of the gear section 2c.

In the present embodiment, the 2 group variable focusing lens composed of the rear lens group LR and front lens group LF is used. Then, by the drive of the motor M1, the movable lens barrels 2 and 3 are moved in the optical axis direction, and the rear lens group LR and the front lens group LF are moved in the optical axis direction, and the operation to change the focal distance of the lens is conducted.

Specifically, in order to change the focal distance of the lens, by the drive of the motor M1, the torque is given to the gear train and the gear 8, and the movable lens barrel 2 is rotated when the gear 8 is engaged with the gear section 2c. In this case, the movable lens barrel 2 moves in the optical axis direction according to the lead of the male helicoid to the camera main body frame 1. Further, because the male helicoid 3a is helicoid-screwed with the female helicoid 2b of the movable lens barrel 2, the movable lens barrel 3 moves in the optical axis direction while the rotation is restricted by the guide member, not shown, according to the lead of the male helicoid 3a, by the rotation of the movable lens barrel 2. Further, by the drive of the motor M2, the front lens group LF is moved in the optical axis direction, and the focus adjustment is conducted.

In this connection, in the shown example, 2 group variable focus lens is used, however, the variable focus lens composed of more than 3 groups can be used.

Onto a boss 1b, for example, the electrode member A4 as the focal distance setting means is fixed by a screw 5. The electrode member A4 has a fixed electrodes A41 and A42 in which a plurality of electrode pieces are formed like the teeth of a comb, on the surface A4b side of the support plate A4a (the opposite surface side to the movable lens barrel 2), as shown in FIG. 12 (a).

The setting of the focal distance is conducted by moving the movable lens barrels 2 and 3 in the optical axis direction by the motor M1 and the motor M2. The present embodiment has the lens of the focal distance adjustment range (variable focal distance range) of, for example, 35–105 mm, and by the drive of the motor M1 and the motor M2, the various focal distance is set within the focal distance adjustment range. That is, by the drive of the motor M1, the movable lens barrels 2 and 3 are moved in the optical axis direction by the action between the female helicoid 1a and the male helicoid 2a and the action between the female helicoid 2b and the male helicoid 3a. Then, by the drive of the motor M2, the front lens group LF is moved in the optical axis direction to the movable lens barrel 3.

Numeral 6 is a ring-like electrode support member as shown in FIG. 11, and by the rotation of the movable lens barrel 2, in the movement in the optical axis X direction, it is integrated with the movable lens barrel 2, but it is not rotated. That is, a rib 6d provided onto the electrode support member 6 is engaged into a groove 2d as shown in FIG. 9 and FIG. 11, and when the movable lens barrel 2 is moved in the optical axis direction X, it is moved together with the movable lens barrel 2. Further, the electrode support member 6 has a rib 6c engaged into the guide groove 1c parallel to the optical axis direction X provided onto the fixed lens barrel 1, and the rotation of the electrode support member 6 is regulated. A movable electrode 6a is provided onto the electrode support member, and engaged into the guide groove 1c and fixed onto a support arm 6b which is commonly used with the guide member, and at the time of the movement in the optical axis X direction while the movable lens barrel 2 is rotated, it is moved in the optical axis direction while the rotation is regulated.

The movable electrode 6a is composed of 4 electrodes as shown in FIG. 12(a), and slidingly moves on the fixed electrodes A41 and A42 of the electrode member A4 as shown by the dotted line La-Ld. The electrode pieces A421, A12–A415 of the fixed electrode A41 correspond to the stop position of the movable lens barrel 2, and the movable electrode 6a is moved as shown by an arrow Wa or Wb by the pressing of the zoom operation button, not shown, and when the pressing is released, after the released time point, at the position of the electrode pieces A41k (k=1–5) with which the movable electrode 6a is brought into contact, the drive circuit of the motors M1 and M2 is turned off, and the movable lens barrels 2, 3 are stopped, and the lens is set at the focal distance set by the photographer.

When the zoom operation button is pressed toward the tele side, the movable electrode 6a is moved as shown by an arrow Wa, and when the zoom operation button is pressed toward the wide side, the movable electrode 6a is moved as shown by an arrow Wb. Herein, the arrow Wa is an optical axis direction tele side (the direction toward which the lens is extruded) and the arrow Wb is an optical axis direction wide side (the direction in which the lens is accommodated from the extruded position to the accommodation position).

In the present embodiment, as shown in FIGS. 12(a) and FIG. 12(b), as the electrode member, the electrode members A4 and B4 having 2 kinds of patterns are prepared.

The electrode member A4 of FIG. 12(a) has the fixed electrode A41 having 5 electrode pieces A411, A412–A415, and the fixed electrode A42 having 7 electrode pieces A421, A422–A427. The electrode piece A421 gives the lens accommodation position of the movable lens barrel 2 which is called collapsible mount position. The electrode member B4 of FIG. 12(b) has the fixed electrode B41 having 3 electrode pieces B411, B412, B413 and the fixed electrode B42 having 5 electrode pieces B421, B422–B425. The electrode piece B421 gives the lens accommodation position of the movable lens barrel 2 which is called collapsible mount position. The length of the fixed electrode A41 and the fixed electrode B41, that is, the length between the electrode pieces A411 and A415, and the length between B411 and B413 are formed equally. However, in the number of the electrode pieces, the fixed electrodes A41 and B41 are formed differently from each other. In also the fixed electrodes A42, B42, the electrode pieces A421–A427, B421–B425 having different number corresponding to those number of pieces are formed.

In this connection, in the example in FIGS. 12(a), (b), the electrode member having 2 kinds of fixed electrodes is shown, and the arbitrary numbers of electrode members can be prepared at need, and the number of electrode pieces provided onto each electrode is also variously selected at need.

As described above, when the electrode member in which the variable range (variable focal distance range) of the focal distance of the lens as the electrode member is equal, but which gives different stop position in the variable range is fixed onto the screw 5, the plural kinds of variable focal distance lenses in which the variable range of the focal distance is equal, but the focal distance set in the variable range is different, are produced.

In the production of the camera, the movable lens barrels 2, 3, the rear lens group LR and front lens group LF constituting the variable focus lens, and the camera main body in which the motors M1 and M2 are assembled, are prepared to the camera main body frame, as common parts, and on the one hand, the plural kinds of electrode members having the different fixed electrode as shown in FIGS. 12(*a*), (*b*), are prepared, and depending on the difference of the electrode member, the plural kinds of cameras having the different performance are produced.

Onto the electrode member A4, the electrodes A401, A402, and A403 are further provided, and onto the electrode member B4, the electrodes B401, B402, and B403 are provided. These electrodes are not used in the operation time of the camera, and used in the production time of the camera. As shown in the drawings, the electrodes A401, A402, A403 and the electrodes B401, B402, B403 are formed into the different patterns, and when the movable electrode 2*c* slidingly moves on these electrodes, the different signal is generated in the electrode members A4 and B4, and the electrode member 4A and 4B are discriminated. In the production process, the discrimination by the electrodes A401–403 and the electrodes B401–b403 is conducted, and each kind of control condition corresponding to each focal distance is set.

In this connection, there is also a case where such plural kinds of camera are simultaneously produced, or they are produced before and after in the time. For example, a case where simultaneously, the plural kinds of cameras are produced and sold, can also be adopted, or a case where a kind of camera is produced and sold, and after its production and sale are stopped, a improved kind of camera by the combination of the camera main body as the common part, and the electrode member specified for the improved kind of camera is produced and sold, can also be adopted.

(Embodiment 3)

Figure 13:
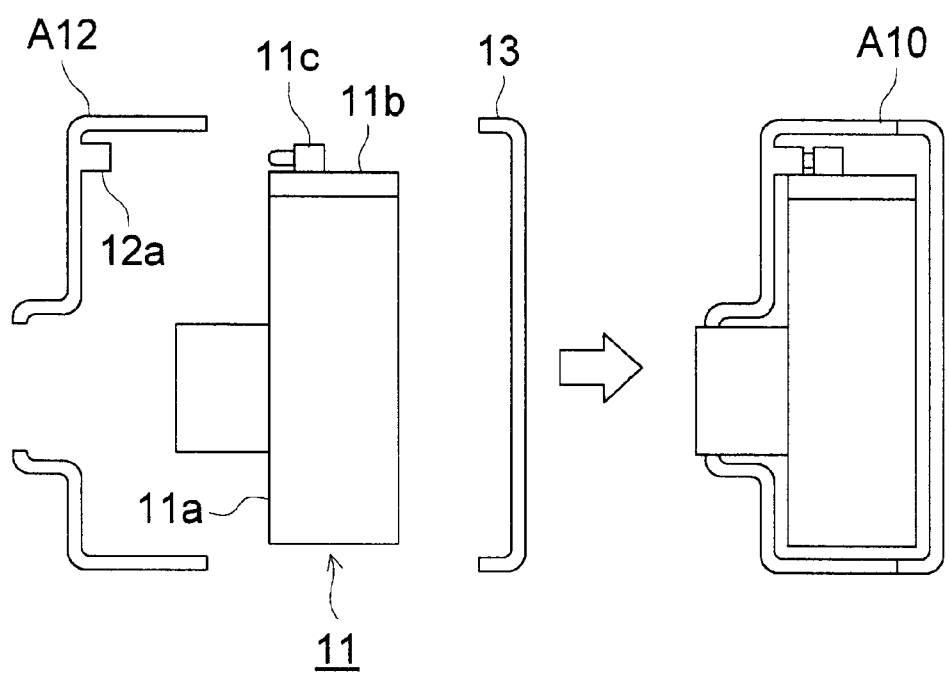
FIG. 13 is a view showing an assembling process of the camera according to the embodiment 2 of the present invention.
Figure 14:
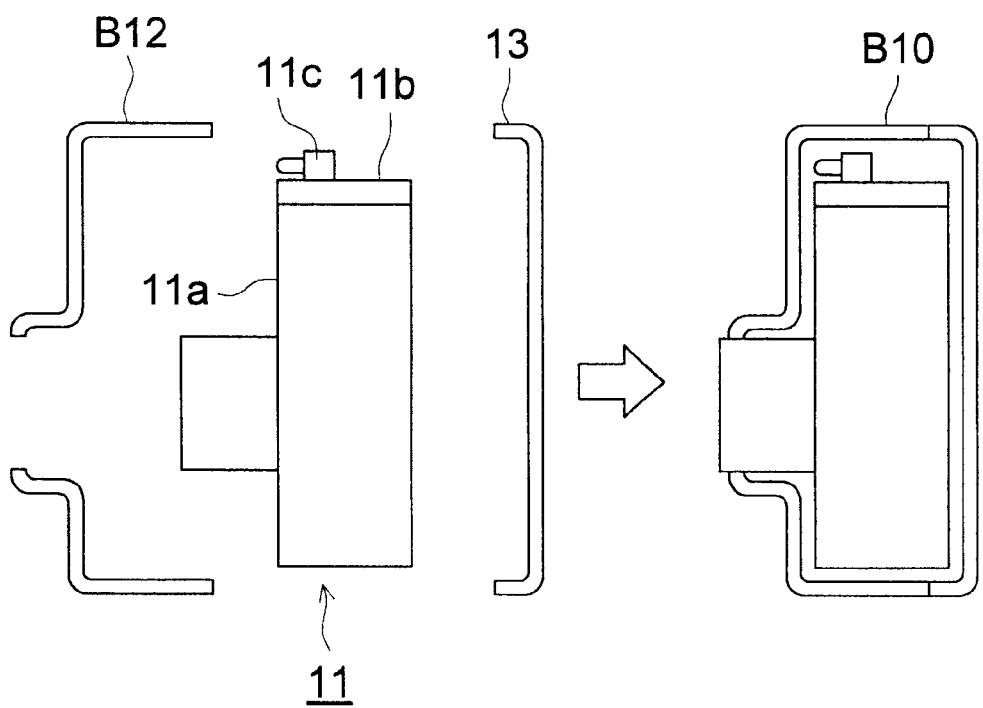
FIG. 14 is a view showing the assembling process of the camera according to the embodiment 2 of the present invention.
Figure 15:
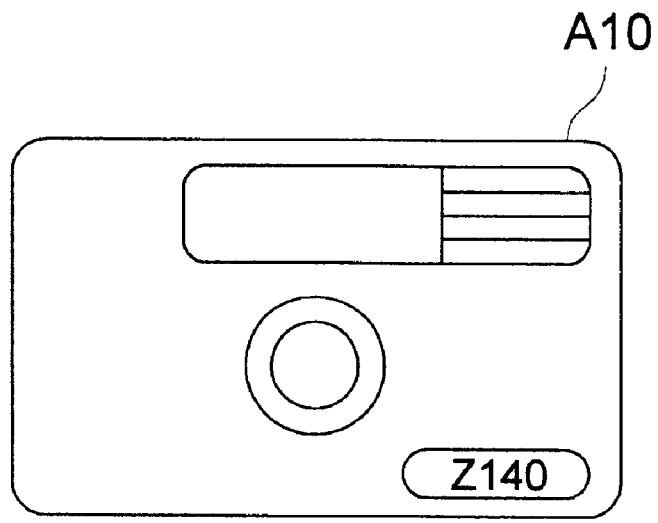
FIG. 15 is a front view of the camera according to the embodiment 2 of the present invention.
Figure 15:
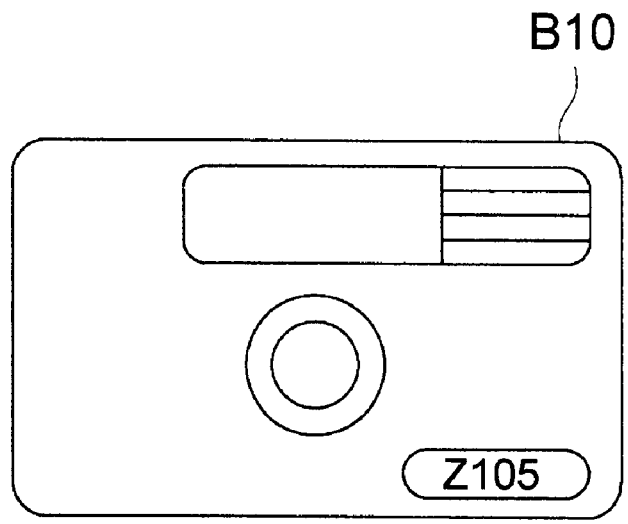

The embodiment 3 of the present invention relates to a production method and camera in which, by the combination of the camera main body and cover, the plural kinds of cameras in which not only the appearance but also the performance is different, can be produced. Referring to FIGS. 13–15, the embodiment 3 will be described.

FIGS. 13(*a*), (*b*), FIGS. 14(*a*), (*b*) show a production process of the camera in the present embodiment 3. The camera main body 11, front cover A12 and rear cover 13 are prepared as in FIG. 13(*a*), and by assembling them, the camera A10 in FIG. 13(*b*) is produced. Further, the same camera main body 11 as shown in FIG. 13(*a*), the front cover B12 which is different from the front cover A12, and the same rear cover 13 as shown in FIG. 13(*a*) are prepared as shown in FIG. 14(*a*), and by assembling them, the camera B10 shown in FIG. 14(*b*) is produced.

The camera main body 11 and rear cover 13 shown in FIG. 13(*a*) and FIG. 14(*a*) are respectively common parts, but the front cover A12 is different from B12. That is, the front covers A12 and B12 are different in the appearance as shown in FIGS. 15(*a*), (*b*), and as shown in FIG. 13(*a*) and FIG. 14(*a*), the structure is different due to the existence of a protrusion 12*a* as the activation member. The camera main body 11 has a main body structure section 11*a* such as the lens or shutter, and an electric substrate 11*b*, and the electric substrate 11*b* has a push switch 11*c* as the function setting means. The push switch 11*c* is a switch to set the function of the camera, and for example, the variable range of the variable focus distance, and the existence of the auto-date function, panorama photographic function, remote controller function, macro mode, and infinity mode, are set depending on a case where the push switch is pressed or not pressed. In this connection, a plurality of push switches are provided, and the plural kinds of each kind of function can also be selected and set.

Accordingly, the camera A10 which is made by assembling the front cover A12, camera main body 11, and rear cover 13 is, for example, as shown by [Z140] in FIGS. 15(*a*), (*b*), the variable focal distance range 35–140, and in contrast to the case, the camera B10 which is made by assembling the front cover B12, camera main body 11, and rear cover 13 is, as shown by [Z105], a camera whose variable focal distance range is 35–105. Then, a plurality of push switches are provided on the electric substrate 11*b*, and when the structure in which protrusions which selectively act on the plural push switches are provided on the front cover, is applied, the plural kinds of cameras having the combinations of various functions can be produced. in this connection, the protrusions as described above, may also be provided on the rear cover 13.

Figure 16:
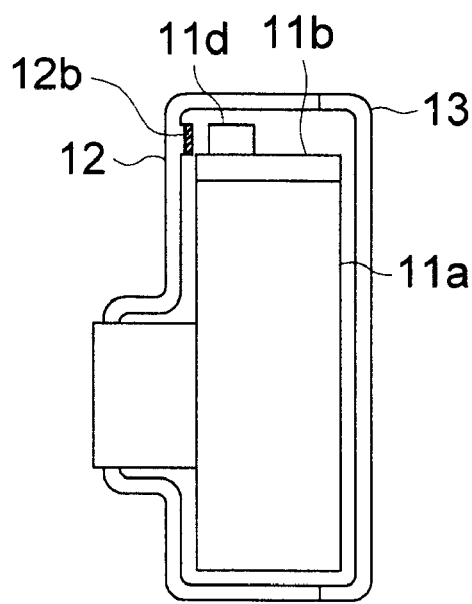
FIG. 16 is a view showing a modified example of the camera according to the embodiment 2 of the present invention.
Figure 16:
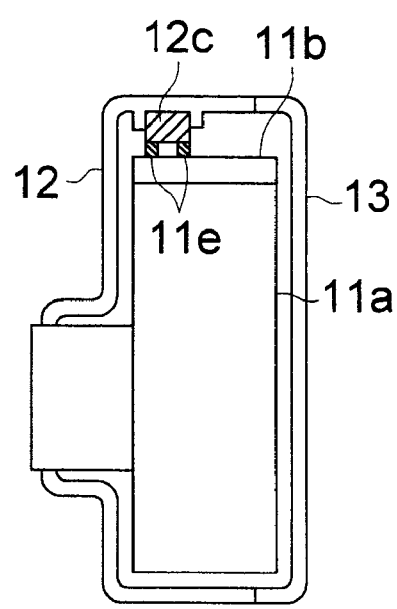

FIGS. 16(*a*), (*b*) show an example in which, instead of the push switch, another function setting means is used. In this connection, for the function setting means, it is not limited to the means in FIGS. 13(*a*), (*b*)–16(*a*), (*b*), but another means can be adopted.

In FIG. 16(*a*), a light switch 11*d* having a light emitting element and a light receiving element as the function setting means is provided on the electric substrate 11*b*, and on other hand, on the front cover 12, a member having a light reflection member 12*b* as an activating member and a member not having it, are prepared. The light switch 11*d* is switched depending on the existence of the light reflection member 12*b*, and the switch-setting of the camera function is conducted. In FIG. 16(*b*), a pair of electrode pieces 11*e* as the function setting means are provided on the electric substrate 11*b*, and on the front cover 12, a member having a conductive member 12*c* which makes conduct between electrode pieces 11*e* as the activating member and a member not having it are prepared. Depending on the existence of the conducting member 12*c*, the electrode pieces 11*e* are switched to the electrical continuity or cutoff, and the switch-setting of the camera function is conducted.

(Embodiment 4)

Embodiment 4 of the present invention is an example of a production method and camera in which, by combination of the camera main body and cover, the plural kinds of cameras in which the operation position of one function is different can be produced. When a camera for the right-handed user and the camera for the left-handed user are provided in the market, the present embodiment is particularly effective. Further, also when the operation position is set according to the desire of the user, by the present embodiment, the operation position can be easily set.

Figure 17:
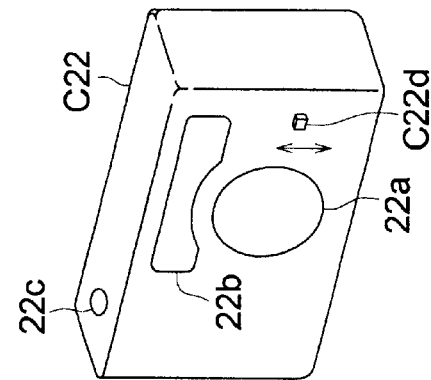
FIG. 17 is a view showing the assembling process of the camera according to the embodiment 3 of the present invention.
Figure 17:
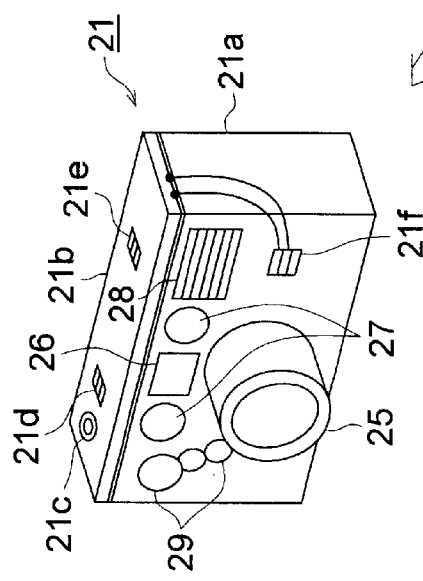
Figure 17:
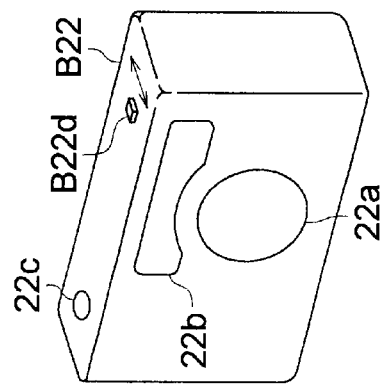
Figure 17:
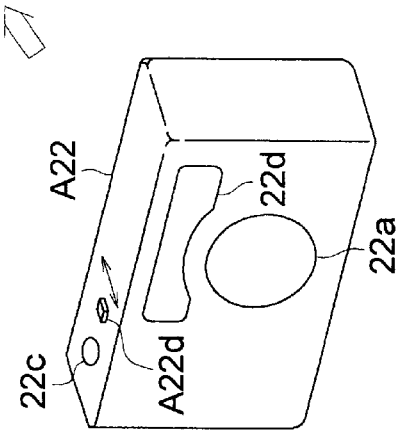

FIGS. 17(*a*)–(*d*) show the assembling process of the camera according to the present embodiment 4. In the present embodiment, the camera main body 21 of FIG. 17(*a*) is composed of the main body structure section 21*a* and electric substrate 21*b*, and the front cover A22 of FIG. 17(*b*), front cover B22 of FIG. 17(*c*), or the front cover C22 of FIG. 17(*d*) are combined with the camera main body 21, and 3 kinds of cameras in which the operation position of the same function is different, are structured.

The main body structure section 21a has a photographic lens 25, viewfinder 26, light projection window, light receiving window 27 for the auto-focus, strobe 28, and gear train 29 for zoom drive of the lens. On the electric substrate 21b, the contact point 21c for release, contact point 21d, contact point 21e and 21f as the function setting means for switch switching the auto-date function to set/unset, are provided, and these switches 21d, 21e, and 21f are connected to a common port of the CPU constituting the control unit to control the camera. On the other hand, the front cover A22 has a hole 22a for the lens, and window 22b, release button 22c, and switching button A22d for auto-date setting as the operation unit. In the front cover A22, the switching button A22d is provided at the position approximate to the release button 22c, that is, at right end portion of the camera upper surface at the time of photographing. In contrast to that, in the front cover B22, the switching button B22d is provided at left end portion of the camera upper surface at the time of photographing. Further, in the front cover C22, the switching button C22d is provided at the left end portion on the front surface of the camera at the time of photographing.

When the camera main body 21 and the front covers A22, B22 or C22 are combined, 3 kinds of cameras whose position of switching button to conduct the setting operation of the auto-date function is different, are produced. In this connection, although it is not shown, when a cover having none of the switching buttons A22d, B22d, and C22d is prepared, total 4 kinds of cameras can be produced. As such the function, there is the panorama photographing, remote control photographing, strobe photographing, macro photographing, or infinity photographing.

(Embodiment 5)

Figure 18:
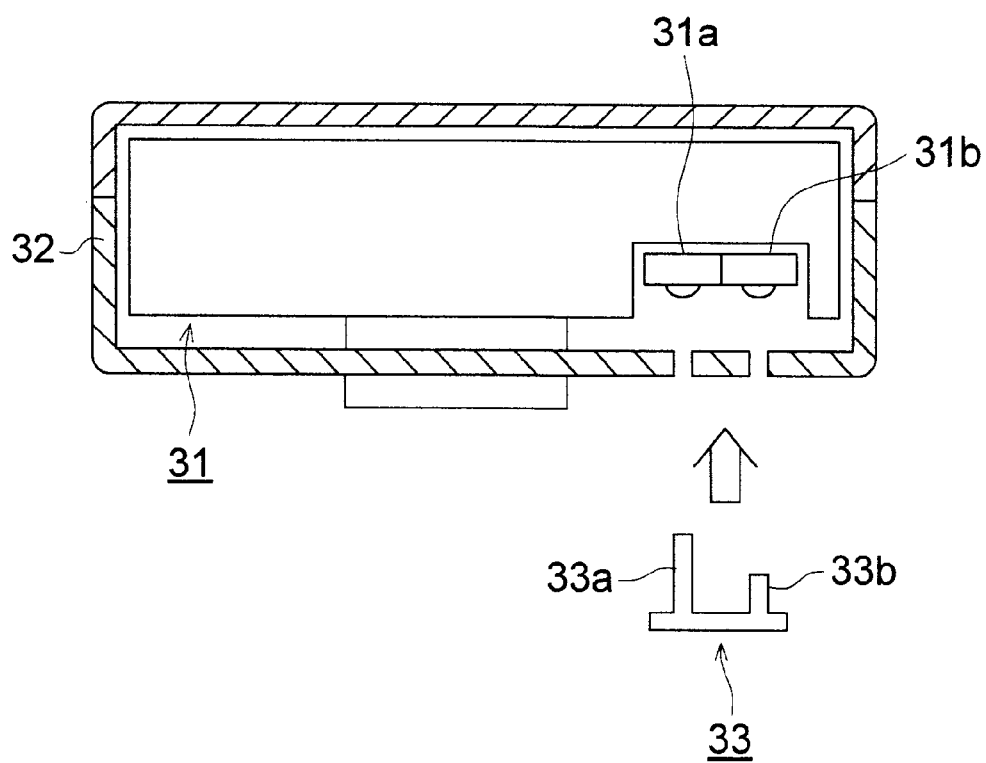
FIG. 18 is a view showing an attaching process of a name plate according to the embodiment 4 of the present invention.

A camera according to the embodiment 5 of the present invention is structured in such a manner that the function is set by a name plate on which the name of the camera, or name of kind of the camera is stamped. Accordingly, the camera onto which the different name plate is attached is the camera to which a function specific to the name plate is automatically set by attaching the name plate. FIG. 18 is a view showing the attaching process of the name plate onto the camera according to the embodiment 5, and FIGS. 19(a)–(d) are views showing examples of the name plate.

The camera is composed of the camera main body 31, cover 32 and name plate 33, and the name plate 33 has pins for fixing the name plate, and is provided with a long fixing pin 33a as the activating member and a short fixing pin which is for fixing, and does not have the function as the activating member, and is fixed on the cover 32 by these fixing pins.

The push switch 31a as the function setting means provided onto the camera main body 31 is pressed by the long fixing pin 33a of the name plate 33, and for example, the auto-date function is set to be usable. The push switch 31b as the function setting means sets, for example, the panorama function to be usable. In the example in FIG. 18, only the push switch 31a is pressed, and the camera provided with the auto-date function is structured.

As the name plate, as shown in FIGS. 19(a)–(d) which are plan view and sectional view, various name palates are prepared, and when these are combined with the camera main body 31 in FIG. 18, the camera provided with the appearance and the function corresponding to that, is produced.

Figure 19:
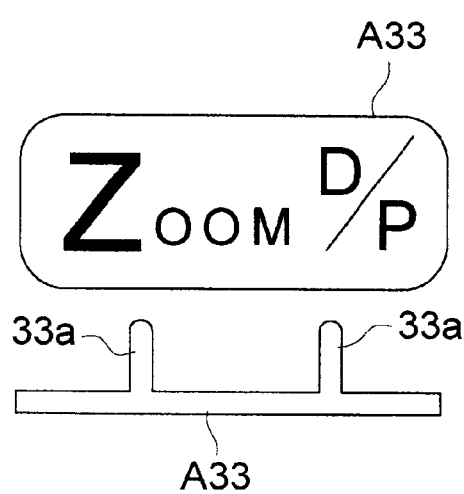
FIG. 19 is a view showing various name plates.
Figure 19:
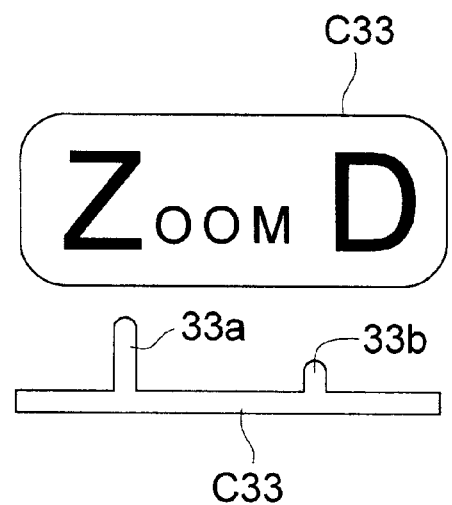
Figure 19:
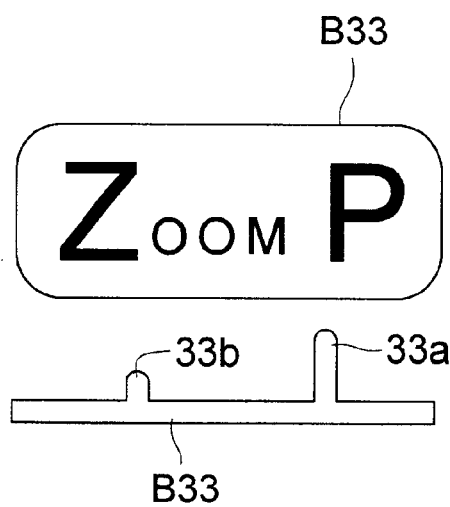
Figure 19:
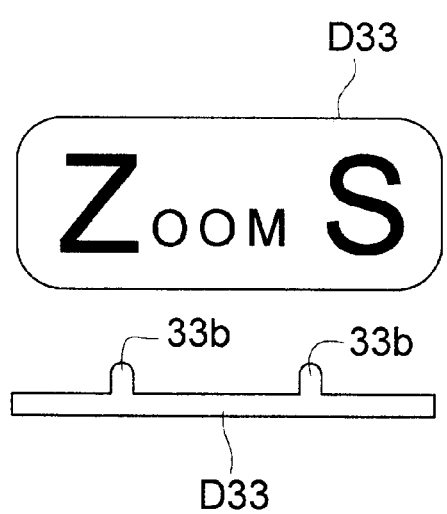

In the name plate A33 in FIG. 19(a), both of the push switches 31a and 31b are pressed, and for example, the camera provided with the auto-date function and panorama function (name; Zoom D/P) is produced, and in the name plate C33 in FIG. 19(b), only the push switch 31a is pressed, and the camera provided with the auto-date function (name; Zoom D), in the name plate B33 in FIG. 19(c), only the push switch 31b is pressed, and the camera provided with the panorama photographing function (name; Zoom P), in the name plate D33 in FIG. 19(d), none of the push switches 31a and 31b is pressed, and the camera provided with the no function (name; Zoom S) are respectively produced.

For cameras described in the above mentioned embodiment 3 to 5, it is preferable that the function setting is made possible in a special mode different from a photographing mode, for example in an exclusive mode for function setting (including test mode exclusive for adjustment), or it is preferable that program etc. in a camera structure is made so that the function setting is possible only when it is allowed by inputting a password etc. By making a camera in the above manner, the following cases can be prevented that after the function setting, for example, when the cover or the name plate falls off by some mechanical shocks the function may be changed against user's intention, or when in adjusting, a switch such as a push switch may be released and the function already set is changed.

Further, the same kind of preventive effect can be attained by making the structure so that after assembling a camera, a program to conduct the function setting, which operates only at the first power on timing, is installed in EPROM and the like in the camera, and in the course of processing the program the function is selected based on the operated switch by the cover or the name plate, and after that the function set is not changed without a special operation. By the above structure, problems which may occur in the following cases can be prevented, where every times power is turned on, the states of the cover or the nameplate is read out from the EPROM and the corresponding program can be selected, in these cases if a system reset is conducted and recovered by a battery reloading and the like, when the cover or the nameplate is not installed, by being recognized that the switch is not operated, the condition may be misunderstood that the other cover or nameplate is installed, or the status recognition can not be performed and error display is being kept (abnormal condition).

Further, by using irrecoverable switches as the switches such as push switches etc. used in the camera of the embodiment 3 to 5, abnormal operations such as the function setting is changed or the function setting is cancelled can be prevented, even when the cover is uninstalled or a contact failure occurs by mechanical shock. Herein, the irrecoverable switch is a slide switch or a switch having click function and the like, and even when the cover is uninstalled the switch keeps the condition where the cover is installed. For a camera not having said special mode, this structure is preferable. And further by taking this structure, another effect is attained that even at a factory where adjusting tools or adjusting computer (checker, for example) is not equipped, the function setting can be conducted.

As described above, embodiments of the present invention are described, and the second object of the present invention can be attained also by the following structure.

1. A production method of the camera which has a variable focus lens, a movable support member supporting the lens element constituting the variable focus lens and moving in the optical axis direction, and a focal distance setting means by which the movable support member is stopped at a plurality of stop positions, and the variable focus lens is set so as to have different focal distance, the production method of the camera is characterized in that: common parts including the variable focus lens and the movable support member and individual parts including plural kinds of the focal distance setting means which has, in the same variable focal distance range, different stop positions, are prepared, and when the common parts and individual parts are assembled, plural kinds of cameras which have the same variable focal distance range and in which the focal distance of at least one portion is set to different value, are produced.

2. A production method of the camera according to 1, wherein the movable support member has a movable electrode piece, and the focal distance setting means is brought into contact with the movable electrode piece, and has a fixed electrode provided with a plurality of electrode pieces giving the stop position of the movable support member.

By the structure of 1 or 2, the camera main body is made a common part, and when an individual part in which only the electrode member is made different for each kind of camera is assembled onto the common part, because a variable focus camera in which the settable focal distance is different is produced, in order to produce the different kind of camera whose settable focal distance is different, it is not necessary that the part of the camera main body is produced individually for each kind of camera, and by only preparing a single part, that is, only the electrode member for each kind of camera, the different kind of camera is produced, and the production cost is reduced, and the switching to the kind of camera of the different function can be quickly conducted.

3. A production method of the camera according to 1 or 2, wherein, as the fixed electrode, an electrode provided with the electrode pieces of the comparatively non-dense distribution, and an electrode provided with the electrode pieces of the comparatively dense distribution are prepared.

By the structure of 3, a plurality of kinds of cameras in which, although it has the same focal distance changing range, the set focal distance is different, can be prepared, and the camera fitted for various needs of the consumer can be produced.

4. A production method of the camera according to any one of 1 to 3, wherein the fixed electrode is provided with the electrode piece showing the kind of the focal distance setting means.

5. A camera which has the variable focus lens, movable support member which supports the lens elements constituting the variable focus lens and moves in the optical axis direction, and focal distance setting means by which the movable support member is stopped at a plurality of stop positions and the variable focus lens is set so as to have different focal distance, the camera is characterized in that the focal distance setting means has the electrode piece to read its kind.

By the structure of 4 or 5, because the setting of the control condition in the different kind of camera whose focal distance is different is automatically conducted by the mechanical reading in the production process of the camera, the false setting is deleted and the setting process for each kind of camera is shortened, and the increase of production cost at the time of multi-product production can be prevented.

6. A camera which is provided with a camera main body having the function setting means for setting the function, and name plate having the activation member for setting the function by acting on the function setting means, the camera is characterized in that the camera has the function set by the name plate.

7. A camera which is provided with a camera main body having the function setting means for setting the function, and a name plate not having the activation member for setting the function by acting on the function setting means, the camera is characterized in that the camera does not have the function.

8. A production method of the camera which is characterized in that: a camera main body having the function setting means for setting the function, the first name plate having the activation member for setting the function by acting on the function setting means, and the second name plate not having the activation member are prepared, and by assembling the camera main body and the first name plate, the first camera having the function is produced, and by assembling the camera main body and the second name plate, the second camera not having the function is produced.

By the structure of 6, 7 or 8, at the time of attachment operation of the name plate which is prepared for each kind of camera, because the function is automatically set corresponding to each name plate, the design work or setting of the control program necessary due to the difference of the kind of camera is deleted, and the increase of the production cost at the time of the multi-model production can be prevented, and the various kinds of products can be quickly provided.

According to the photographing device of the invention of the structure (1) and the program described in the structure (5), a plurality of control sequences conducted according to the operation of the operation member are stored in the memory device, and a predetermined control sequence in the stored plurality of control sequences is set by making correspondence as the control sequence to be controlled by the operation of the operation member, and when the operation member is operated, the set control sequence is conducted. Accordingly, without changing the internal structure or program, the control sequence conducted corresponding to the operation of the operation member can be easily set. As the result, in the production process, by using the common internal structure or program, plural kinds of photographing devices whose operability is different, can be easily produced, and the reduction of the cost due to the simplification of the production process and inventory control, and mass production effect can be realized.

According to the invention described in the structure (2), the setting of the control sequence controlled by the operation of the operation member can be renewed. Accordingly, in the photographing device, the specification change according to the function of the operation member can be easily conducted.

According to the invention described in the structure (3), the camera has a memory device in which the first control sequence to detect the operation of a predetermined operation button, and the second sequence to detect the condition change by the operation of the mechanical section are stored, and either one of the first control sequence or the second control sequence is effectively set by the setting means, and according to the effectively set control sequence, ON/OFF of the power source is turned. Accordingly, it can be easily set without changing the internal structure or program whether the switching of the power source is conducted by the operation of the operation button, or conducted by operating the mechanical section. As the result, a plurality of kinds of cameras whose appearance or operability is different from each other, can be easily produced, and the reduction of the cost due to the simplification of the production process and inventory control, and the mass production effect can be realized.

According to the invention described in the structure (4), a recording medium to store a predetermined control sequence in a plurality of control sequences to be conducted in the photographing device by making correspondence as the control sequence to be controlled by the operation of the operation member, is provided. Accordingly, according to the content of the correspondence of the operation member to be stored in the recording medium with the control sequence, because the photographing device conducts by setting the control sequence to be conducted when the operation member is operated, the content of the recording medium is changed and by only mounting it onto the photographing device, it can be changed to the kind of the camera whose operability is different. As the result, in the production process of the photographing device or at the time of the specification change, the kind of device whose operability is different can be easily produced, and the reduction of the cost due to the simplification of the production process and inventory control, and mass production effect can be realized.

According to any invention of the structures (6)-(10), by the combination of the camera main body and the cover, because the camera having the different function automatically set corresponding to the difference of the appearance is produced, the design work or setting of the control program necessary due to the difference of the kind of the device are eliminated, and the increase of the production cost at the time of the multi-product production can be prevented, and the multi-products can be quickly provided.

According to the invention of the structure (11) or (12), the camera for the right-handed user, camera for the left-handed user, and camera fitted for the desire of the user can be produced by the small change of the process, and the camera which softly corresponds to the desire of the user can be produced.

What is claimed is:

1. A camera comprising:

a camera main body having a first function setting means for setting a function and a second function setting means, which is provided at a different position from the first function setting means, for setting the function; and a first cover having a first operation section by which the operation of the first function setting means can be conducted, and the first cover not having a operation section by which the operation of the second function setting means can be conducted; wherein the function can be set by the first operation section.

2. A camera manufacturing method comprising:

preparing a camera main body having a first function setting means for setting a function and a second function setting means, which is provided at a different position from the first function setting means, for setting the function;

preparing a first cover having a first operation section by which the operation of the first function setting means can be conducted, and the first cover not having a operation section by which the operation of the second function setting means can be conducted, and a second cover having a second operation section by which the operation of the second function setting means can be conducted, and the second cover not having a operation section by which the operation of the first function setting means can be conducted; and assembling the camera main body with the first cover or the second cover to make two kinds of camera, wherein the same function is set at different positions by each kind of the two kinds of camera.

* * * * *